O. T. BUGG, Jr.
MACHINE FOR MIXING AND KNEADING DOUGH OR ANALOGOUS MATERIAL.
APPLICATION FILED FEB. 8, 1905.
949,618.
Patented Feb. 15, 1910.
2 SHEETS—SHEET 1.
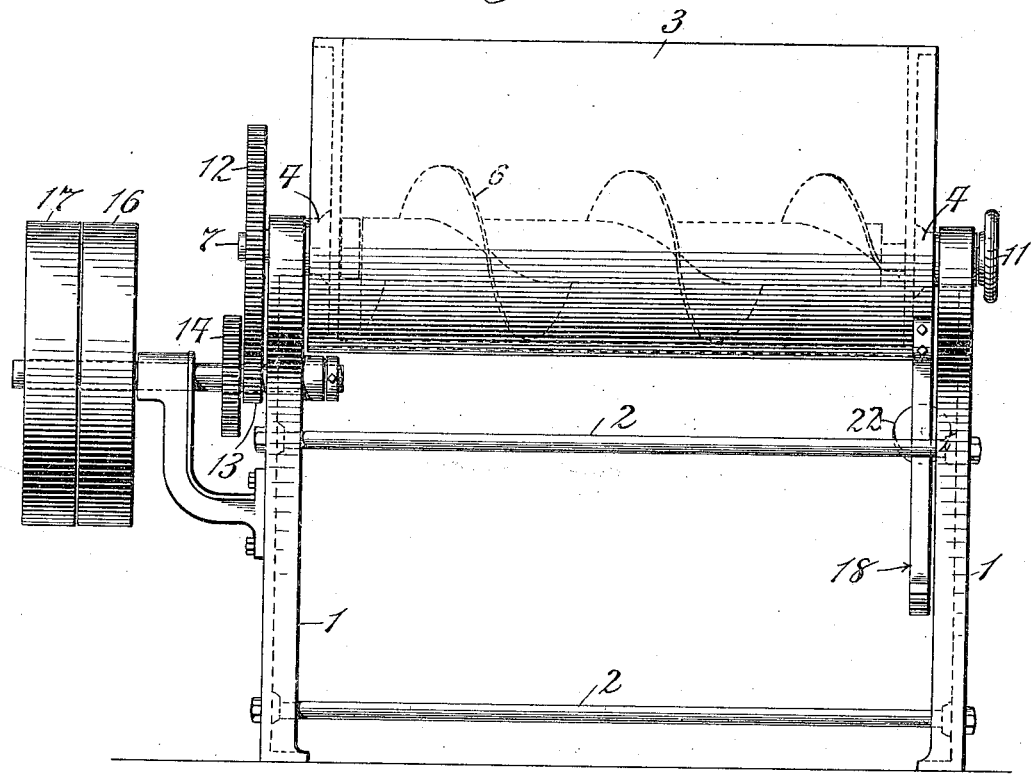

O. T. BUGG, Jr.
MACHINE FOR MIXING AND KNEADING DOUGH OR ANALOGOUS MATERIAL.
APPLICATION FILED FEB. 8, 1905.
949,618.
Patented Feb. 15, 1910.
2 SHEETS—SHEET 2.
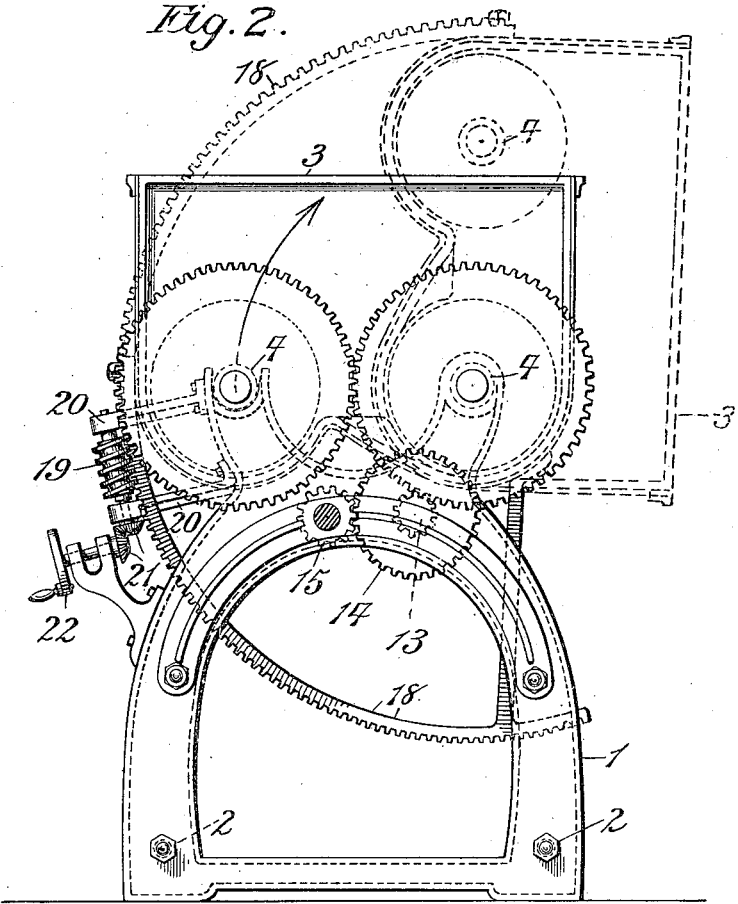
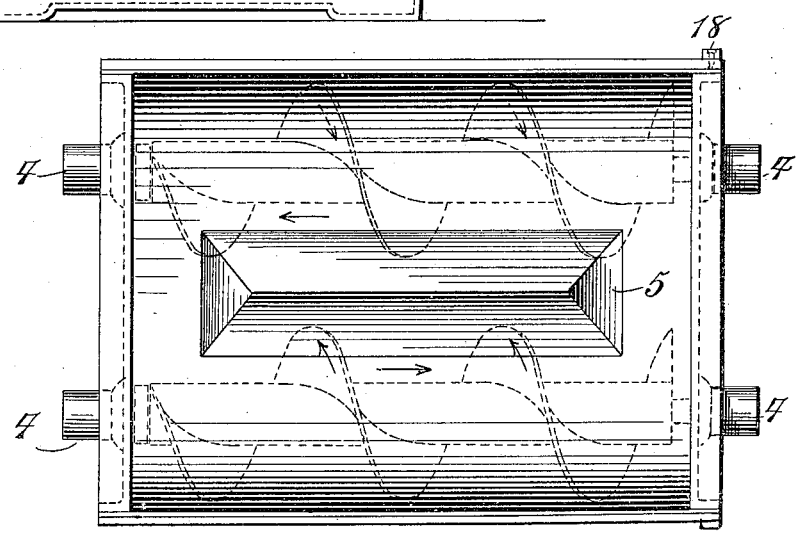

UNITED STATES PATENT OFFICE.

OWEN T. BUGG, JR., OF NEW YORK, N. Y., ASSIGNOR, BY MESNE ASSIGNMENTS, TO HARRY P. BARR, OF EAST ORANGE, NEW JERSEY.

MACHINE FOR MIXING AND KNEADING DOUGH OR ANALOGOUS MATERIAL.

949,618.  Specification of Letters Patent. Patented Feb. 15, 1910.

Application filed February 8, 1905. Serial No. 244,732.

*To all whom it may concern:*

Be it known that I, OWEN T. BUGG, Jr., a citizen of the United States, residing in New York, borough of Manhattan, and county and State of New York, have made a new and useful Invention in Machines for Mixing and Kneading Dough or Analogous Materials, of which the following is a specification.

My invention is directed particularly to improvements in that type of mixing and kneading machines in which the dough or analogous material is subjected to the action of feeding and mixing spirals which continuously move the material back and forth in an oblong trough and subject it to a mixing and kneading action, said spirals being so located that one of them advances the material toward one end of the trough and the other in a reverse direction, they always turning toward each other, and it has for its object to provide means for preventing any part of the material from not being thus continuously advanced in either direction.

In the use of that type of dough kneading machines in which the material is continuously advanced, first in one direction and then in the other between two spirals or screw-like feeding devices which rotate always toward each other, I have ascertained that a neutral line always exists in the material between the feeding and mixing spirals where the same remains relatively stationary or inert; or, in other words, it is not continuously moved as it should be for the purpose of obtaining the best results. To this end I have devised means consisting of a rib or upward extension from the bottom of the mixing trough located between the two feeding and mixing spirals and so disposed with relation to the same that each particle of the dough or material to be mixed or kneaded is caused to be advanced continuously thereby eliminating entirely what I have termed the neutral or inert mass of such material, and the means for effecting this result constitutes the essential element of my invention.

A further feature of novelty lies in so sustaining the mixing and kneading trough at its opposite ends that it and its contents may be rotated bodily to such an extent as to permit of the removal of the material after the process of mixing and kneading has been effected, and this feature of my invention embraces double supports at each end of the mixing trough, one pair of which on one side constitutes a pivotal axis about which the trough is revolved and the other pair on the opposite side a support for that side of the trough, the arrangement being such that the entire structure possesses great rigidity and is capable of effective operation with a minimum number of parts so arranged as to give the best result.

For a full and clear understanding of my invention, such as will enable others skilled in the art to construct and use the same reference is had to the accompanying drawings, in which, Figure 1 is a side elevational view of the complete machine, one of the feeding and mixing spirals and the interior end structural surface of the mixing and kneading trough being shown in dotted lines. Fig. 2 is an end elevation of the apparatus shown in Fig. 1; the shaft which supports the fast and loose driving pulleys being shown in sectional view, and the mixing and kneading trough in its revolved position for removing the completed product shown in dotted lines at the top and right of the drawing. Fig. 3 is a plan view of the mixing and kneading trough detached from the frame which supports it, the feeding and mixing spirals being shown in this view in dotted lines; and the rib intermediate the mixing spirals in full lines.

Referring now to the drawings in detail, in all of which like numerals represent like or equivalent parts wherever used, 1 represents the frame of the machine provided with downwardly extending legs and two integral upwardly extending arms at each end thereof for supporting the entire machine, said frame being held together by four longitudinally disposed bolts 2, 2, 2, 2.

3 represents the mixing and kneading trough which is preferably semicylindrical in form and provided with parallel cast iron heads integral with which are supporting trunnions 4, 4, 4, 4, two at each end. Two of these trunnions are inserted in corresponding journal bearings in the frame 1 when the machine is put together; the other pair being located in U shaped supports, as will be apparent on inspection of Fig. 2.

5 constitutes a rib or upward extension from the bottom of the mixing and kneading trough, the function of which will be described later on, said extension being of an elongated pyramidal shape and may be secured to the bottom of the trough by screws or otherwise, if desired.

6, 6, represent the feeding and mixing spirals of well known form secured each at one end to a short shaft 7 by a pin 8 and slot 9 and at the other end by a trunnion 10 screw-threaded in the trunnion 4 and having an operating head 11, the arrangement being such that said spirals may be put in place or removed at will and so adjusted longitudinally as to give the best results. The two short shafts 7 carry gear-wheels 12 which intermesh and one of said gear-wheels intermeshes with a pinion 13 upon an additional shaft journaled in the frame and carrying also a gear-wheel 14 which meshes with a driving pinion 15 upon a driving shaft supported by a standard attached to the frame, said driving shaft being provided with fast and loose pulleys 16 and 17.

18 is a cylindrical rack connected directly to the other end of the mixing and kneading trough 3 and having its center of rotation in the axial line of the supporting shaft of one of the feeding and mixing spirals 6, said rack meshing with a worm-gear 19 on a shaft journaled in standards 20 secured directly to the frame 1; 21, 21 being bevel gear-wheels and 22 an operating handle so supported by the frame and interconnected with each other and with the shafting as to constitute means for rotating the mixing and kneading trough into the position shown in dotted lines, Fig. 2, the arrangement being such that normally, or when the machine is ready for operation, the mixing and kneading trough is in the position shown in full lines with both of the trunnions 4 at each end of the trough firmly supported by the frame.

As hereinbefore stated, with existing types of dough mixing and kneading machines where the feeding and mixing spirals 6 rotate toward each other and cause the material being acted upon to be advanced continuously around and around from one end of the trough to the other and back in the manner shown by the arrows in Fig. 3, there is a relatively large mass thereof intermediate the spirals which is not moved, or if moved it is at such a slow rate of speed as to materially increase the time necessary for the effectual kneading of the dough. To do away with this objectionable feature I have devised means, consisting of a longitudinally disposed upward rib or extension 5 converging upward in thickness and with upwardly converging ends as shown particularly in Fig. 3, so as to closely hug the peripheries of the spirals and also to afford sufficient space between the respective ends of the rib and the adjacent ends of the mixing trough to permit the passage or transfer of the dough from the tail of one spiral to the head of the other in a continuous circulating movement, said extension projecting upward, preferably to a point approximating a horizontal plane passing through the axes of the two feeding and mixing spirals 6. It results as an important function and effect of the form of interposed rib, with upwardly converging ends as shown in Fig. 3 that the transverse or transfer movement from one spiral to the other at the ends of the trough is most free in the upper portion of the mass of dough, so that in the transverse and circulating movements the dough is conducted and presented to the combined action of the spirals in the most effective manner.

The mode of operation will be obvious, it being apparent that when power is transmitted through the fast pulley 16 and the chain of pinions and gear-wheels 15, 14, 13, 12, 12, the two feeding and mixing spirals 6, 6, will be rotated in the directions shown by the arrows on their curvilinear blades, in Fig. 3, thus causing the material to be advanced in the directions indicated by the straight arrows continuously around and around from one end of the trough to the other. After the process has continued for a sufficient length of time to complete the mixing and kneading the trunnions 10 are withdrawn by turning the heads 11 thereof so as to unscrew them and the feeding and mixing spirals 6, 6, are both removed. The attendant then, through the agency of the operating handle 22, interconnected shafting, bevel gear-wheels 21, worm-gear 19 and rack 18 rotates the mixing and kneading trough 3 in the direction of the large arrow, Fig. 2, until said trough and all of the interconnected parts assume the position shown, when the entire contents may be readily removed.

I am aware that a dough kneading machine has heretofore been devised provided with two sets of short rotatable spirally disposed blades, both of which sets rotate continuously in the same direction, there being combined therewith an intermediate, upwardly extending rib between the two sets of blades, as disclosed in U. S. patent to Chambers No. 723,987, granted March 31st, 1903. I am also aware of a somewhat similar machine in which there are two series of short spirally arranged mixing arms supported by parallel rotatable shafts and intergeared so as to rotate in opposite directions with an upwardly extending rib beneath said arms. Such machines, however, are not open to the objection which my improvement was devised to overcome; namely, for preventing the inert mass of material which is found to exist in machines of the Lee type, as disclosed in U. S. patent to Lee, No. 696,575, of April 1st, 1902, and upon which machine the present invention is an improvement, and my claims are directed specifically to the combined details of construction hereinafter enumerated and for effecting the more perfect mixture of the dough than was possible with machines of this type, in which both of the continuous spirals are so interconnected or intergeared as to cause the spirals to rotate always toward each other and toward the intermediate upwardly extending rib.

Having thus described my invention what I claim and desire to secure by Letters Patent of the United States is—

In a mixing and kneading machine two continuous feeding and mixing spirals journaled in a mixing trough and interconnected by gearing mechanism adapted to rotate them toward each other; in combination with an interposed rib converging upward from the bottom of the mixing trough closely adjacent to both said spirals and having upwardly converging ends whereby the material is advanced from one end of the trough to the other by one spiral, thence transferred freely to the action of the other spiral and by this conducted back to the first end of the machine and there transferred to the head of the first spiral in a continuous circulating movement as described.

In testimony whereof I have signed my name to this specification in the presence of two subscribing witnesses.

OWEN T. BUGG, Jr.

Witnesses:
C. J. KINTNER,
M. F. KEATING.